United States Patent [19]

McCanse et al.

[11] Patent Number: 4,987,733

[45] Date of Patent: Jan. 29, 1991

[54] CHRISTMAS TREE SHAKER

[75] Inventors: Richard L. McCanse, Oregon, Ill.; James E. McCanse, c/o McCanse Engineering Services, 949 Etnyre Terrace Rd., Oregon, Ill. 61061; Timothy K. Fulmer, Dixon, Ill.

[73] Assignee: James E. McCanse, Oregon, Ill.

[21] Appl. No.: 375,811

[22] Filed: Jul. 5, 1989

[51] Int. Cl.$^5$ ............................................. A01D 46/00
[52] U.S. Cl. ........................................ 56/340.1; 56/1
[58] Field of Search ................ 56/340.1; 209/606, 699

[56] References Cited

U.S. PATENT DOCUMENTS

| | | | |
|---|---|---|---|
| 2,522,906 | 9/1950 | Smith | 56/340.1 |
| 4,320,618 | 3/1982 | Dandl | 56/340.1 |
| 4,409,782 | 10/1983 | Westergaard et al. | 56/340.1 |
| 4,872,565 | 10/1989 | McAlpine | 56/340.1 |

OTHER PUBLICATIONS

One page advertisement on New Horizons Tree Shakers, published in Oct. 1988 issue of WCTPA Quarterly Journal, p. 14.

Primary Examiner—Ramon S. Britts
Assistant Examiner—Terry Lee Melius
Attorney, Agent, or Firm—Leydig, Voit & Mayer

[57] ABSTRACT

A machine for shaking Christmas trees to remove loose needles therefrom. The machine includes a frustoconical holder for receiving the trunk of the tree and adapted to be orbited by a power-rotated shaft in order to shake the tree. A flexible belt is connected between the holder and the housing of the machine in order to prevent the holder from spinning about its own axis as it orbits. The holder is inclined upwardly from horizontal to facilitate loading of the tree into the holder, to reduce the effort required to retain the tree in the holder during shaking and to avoid burying of the machine with needles. A guard shields the holder to help protect against injury and also serves as a cradle to support the tree prior to loading of the tree into the holder. The machine may be converted for driving by the power take-off of a tractor or for driving by an electric motor.

14 Claims, 3 Drawing Sheets

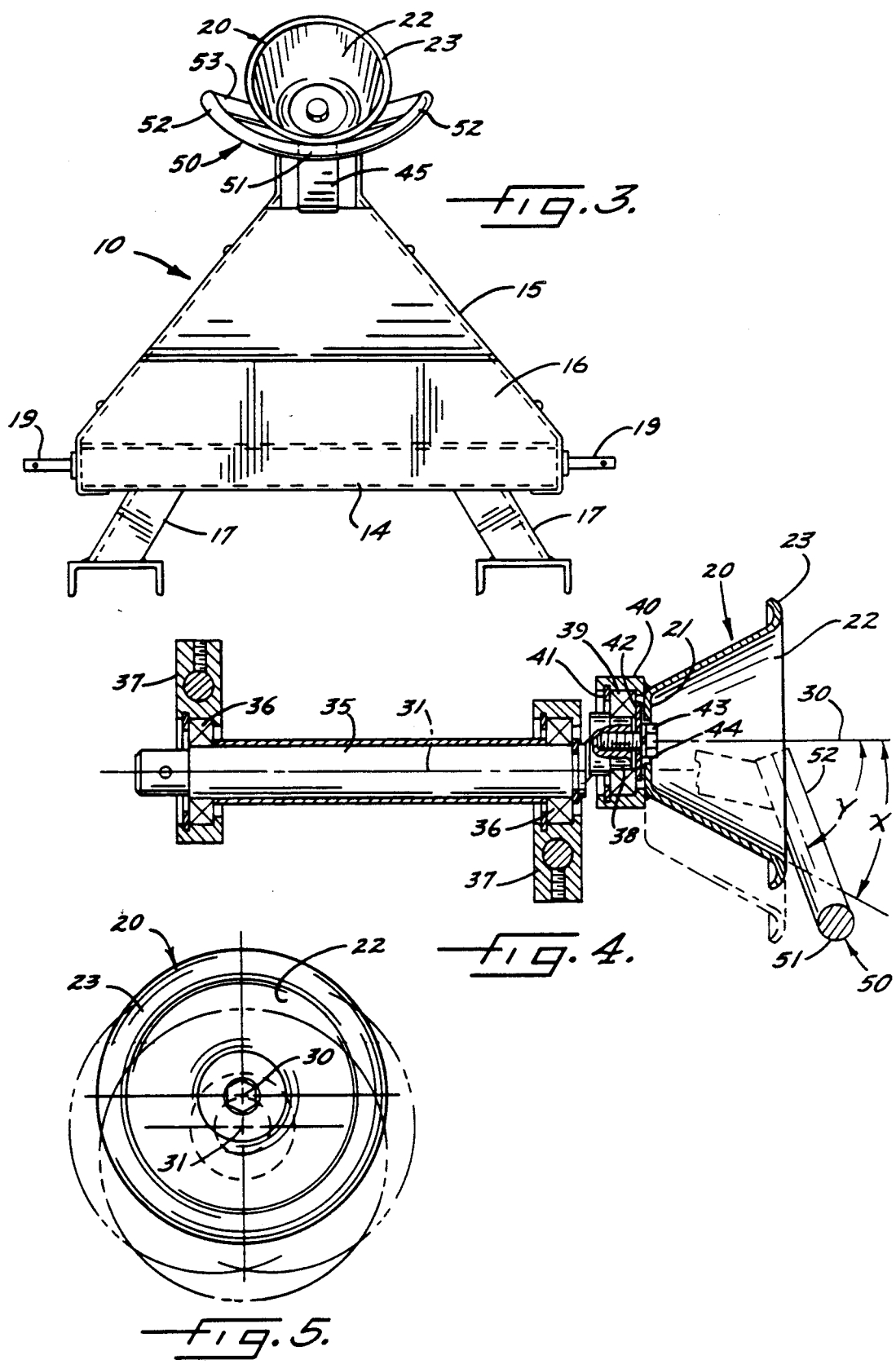

CHRISTMAS TREE SHAKER

BACKGROUND OF THE INVENTION

This invention relates to a machine for shaking a cut decorative tree such as a Christmas tree in order to vibrate loose needles from the tree.

A conventional Christmas tree shaker has a funnel-like holder adapted to receive the trunk of the tree and adapted to be vibrated in order to shake the tree. In some shakers, the holder is vibrated by orbiting the holder about the axis of a power-rotated drive shaft. The holders of prior shakers are oriented either horizontally or vertically. With a shaker having a horizontal holder, considerable manual effort is required to hold the tree up and to keep the end of the trunk securely seated in the vibrating holder during shaking of the tree. Less effort is required to hold the tree in place in a vertically oriented holder although relatively large effort is required to initially place a large tree in the holder. When the vertical holder is vibrated, the needles fall vertically and tend to fill up the holder and bury the tree shaker.

In some cases, shaking of the trees is performed at the tree farm by the grower who uses the power takeoff of a tractor to drive the tree shaker. Trees also are shook at retail lots where only a source of electrical power is available.

SUMMARY OF THE INVENTION

The general aim of the present invention is to provide a new and improved tree shaker which, when compared with prior machines of the same general type, is of simpler and less expensive construction, is easier and more convenient to use, is safer and more versatile, and is more rugged and trouble-free in operation.

Another object of the invention is to provide an easy-to-use tree shaker in which the holder is uniquely angled in order to enable easy manual loading and holding of the tree while avoiding burying of the tree shaker with needles.

Another object of the invention is to provide a unique guard which not only shields the orbiting holder to help protect against injury but which also serves as a cradle to support the tree prior to loading of the tree into the holder.

Still a further object of the invention is to hold the orbiting holder against rotation with a simple and inexpensive flexible strap which also reduces stress on the support bearings for the holder and its drive shaft.

The invention also resides in the novel construction enabling the tree shaker to be quickly and easily converted for use with either a power take-off drive or an electric motor drive.

These and other objects and advantages of the invention will become more apparent from the following detailed description when taken in conjunction with the accompanying drawings.

BRIEF DESCRIPTION OF THE DRAWINGS

FIG. 3 is a rear end view of the shaker as seen along the line 3—3 of FIG. 2.

FIG. 4 is an enlarged cross-sectional view taken axially through the holder and drive shaft of the shaker of FIGS. 1 to 3, the holder and shaft being shown in a horizontal position simply for convenience of illustration.

FIG. 5 is a rear end view of the holder shown in FIG. 4.

DETAILED DESCRIPTION OF THE PREFERRED EMBODIMENTS

Figure 1:
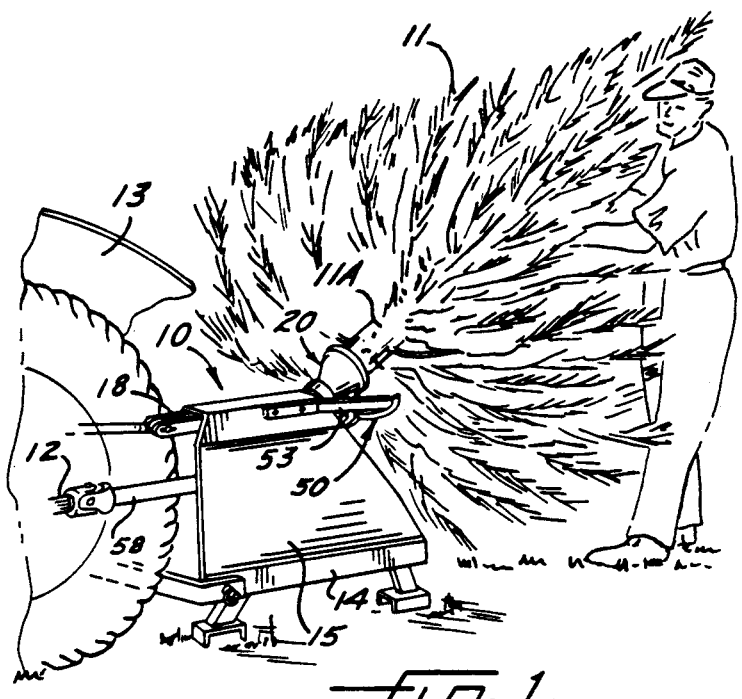
FIG. 1 is a perspective view of one embodiment of a new and improved tree shaker incorporating the unique features of the present invention.
Figure 2:
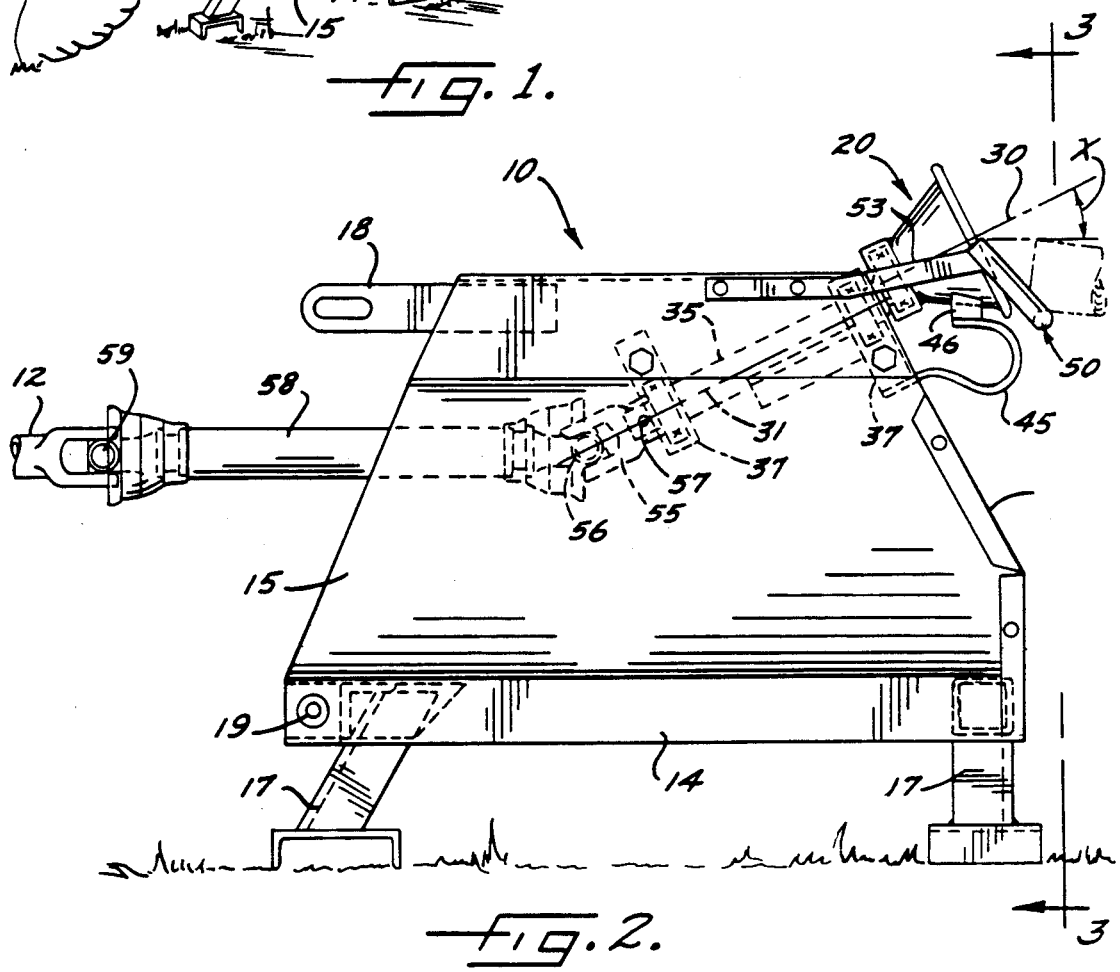
FIG. 2 is an enlarged side elevational view of the tree shaker/shown in FIG. 1.

For purposes of illustration, the invention has been shown in the drawings as embodied in a machine 10 for shaking loose needles from a Christmas tree 11 or other decorative tree. The embodiment of the tree shaker shown in FIGS. 1 to 5 is especially adapted for use by a grower at the tree farm and is adapted to be driven by the power take-off 12 of a tractor 13 or other motorized vehicle.

The tree shaker 10 includes a main support formed by a lower rectangular frame 14 and by an upper sheet metal housing 15. A rear cover 16 is removably attached to the housing. Four legs 17 depend from the corners of the frame 14 and support the shaker 10 on the ground or pavement. Upper and lower hitch elements 18 and 19 (FIG. 2) on the frame and the housing may be coupled to the three-point hitch of the tractor 13 to enable the shaker to be easily transported.

Shaking of the tree 11 is effected by inserting the butt end of the tree trunk 11A into a holder 20 which is adapted to be moved in an orbit in order to cause loose needles to drop from the tree. In the present instance, the holder is located at the rear end of the housing 15 and is in the form of a frustoconical cup. Thus, the holder 20 includes a forward end wall 21 (FIG. 4), a tapered side wall 22 and an open rear end which is encircled by a forwardly curled flange 23. In use, the tree 11 is held as shown in FIG. 1 and its trunk 11A is inserted endwise into the holder 20 until the butt end of the trunk wedges against the tapered side wall 22 of the holder. Vibration of the holder is transmitted to the trunk to shake the tree vigorously and cause loose and dead needles to drop to the ground.

In accordance with one aspect of the present invention, the holder 20 is neither vertical nor horizontal but instead is inclined so that its open end faces both upwardly and rearwardly. Herein, this is achieved by orienting the frustoconical holder such that its axis 30 is inclined upwardly relative to horizontal at an acute angle X (FIG. 2) of about 25 degrees but, as will be explained subsequently, the angle could range upwardly to 75 degrees.

With the holder 20 being inclined as shown, it is a fairly easy matter to tip the tree 11 upwardly and place the trunk 11A in the holder. Less effort is required to insert the tree into the inclined holder than is the case when the holder is vertical and, in addition, the needles fall to the rear of the shaker 10 instead of falling directly downwardly and burying the shaker. Moreover, because the holder and the tree are inclined, it is easier to manually support the tree and to push the trunk tightly into the holder than is the case when the holder is horizontal.

Vibration of the tree 11 is effected by orbiting the holder 20 about an axis 31 (FIG. 2) which parallels the axis 30 of the holder. For this purpose, the shaker 10 includes a rotatable shaft 35 (FIG. 4) whose axis coincides with the axis 31. The shaft is journaled by bearings 36 supported in bearing blocks 37 which are attached to and located in the housing 15. Attached rigidly to the rear end of the shaft is a stepped-diameter eccentric 38 whose axis coincides with the axis 30 of the holder 20 and thus is offset radially from the axis 31 of the shaft 35.

The eccentric 38 is secured to but is rotatable relative to the holder 20. To this end, the inner race of a ball bearing 39 is press-fit onto the eccentric and its outer race is press-fit into a bearing cup 40, the latter being welded to the end wall 21 of the holder. A snap ring 41 at the front of the bearing 39 coacts with the rear flange of the cup 40 to retain the bearing in the cut. The bearing is retained axially on the stepped-diameter eccentric 38 by a washer 42 which is clamped against the rear side of the inner race of the bearing by a screw 43. The screw extends through an enlarged clearance hole 44 in the end wall 21 of the holder 20 and is threaded into the eccentric.

With the foregoing arrangement, rotation of the shaft 35 causes the eccentric 38 and the holder 20 to orbit about the axis 31 through the positions shown in phantom lines in FIG. 5. As a result of the butt end of the trunk 11A orbiting with the holder 20 while the body of the tree 11 is manually held as shown in FIG. 1, a vigorous shaking action is imparted to the tree in order to remove loose needles.

According to another aspect of the invention, extremely simple and inexpensive means are provided for preventing the holder 20 from rotating about the axis 30 as it orbits about the axis 31. Herein, these means comprise a flexible strap or belt 45 (FIG. 2) made of conventional V-belt or conveyor material and having a lower forward end which is attached rigidly to the housing 15. Adjacent the attachment point, the belt is formed into a reverse C-shaped configuration, the upper leg of the C underlying the longitudinal centerline of the holder 20. The upper end portion of the belt is fastened to a cradle-like bracket 46 which, in turn, is welded to the lower side of the holder.

The belt 45 is sufficiently flexible to allow the holder 20 to orbit about the axis 31 when the shaft 35 is rotated. At the same time, the belt constrains the holder for rotating about the axis 30 and keeps the holder in a substantially fixed angular position in space relative to the latter axis. The holder thus is prevented from spinning the tree 11 and causing possible injury or from rotating relative to the tree and damaging the trunk. The restraining belt is far less expensive than a mechanical linkage and applies very little restriction to the orbiting action of the holder so as to avoid stress on the shaft 35 and the bearings 36 and 39.

The tree shaker 10 also is characterized by a unique guard 50 which shields the holder 20 and which also facilitates insertion of the trunk 11A into the holder. In the present instance, the guard is formed by a length of metal rod, a portion of which is bent into the shape of an upwardly opening U so as to define a cradle having a bottom portion 51 and a pair of side portions 52. Forwardly extending arms 53 (FIG. 2) are integral with the upper ends of the side portions 52 and are attached rigidly to the upper rear portion of the housing 15.

As shown in FIGS. 3 and 4, the lower portion 51 of the guard 50 is located below and rearwardly of the lower end of the holder 20 while the side portions 52 extend upwardly in straddling relation with approximately the lower half of the holder. The side portions are inclined at an acute angle Y (FIG. 4) of about 70 degrees relative to the axis 30 of the holder 20 and thus the guard 50 protects against a person accidentally bumping into the holder.

Before inserting the tree 11 into the holder 20, the trunk 11A is grabbed at its butt end and is dropped into the cradle defined by the guard 50. The operator then walks to the other end of the tree and lifts the tree. As an incident thereto, the weight of the tree causes the trunk to slide automatically into the holder. This allows easy loading of the tree even though the holder and the butt of the trunk cannot be easily seen from the tip end of the tree.

As mentioned previously, the tree shaker 10 of the embodiment shown in FIGS. 1 to 5 is driven by the power take-off 12 of the tractor 13. For this purpose, one knuckle 55 (FIG. 2) of a universal joint 56 is connected to the lower end of the shaft 35 by a pin 57. The universal joint 56 is connected to a horizontal drive shaft 58 which, in turn, is connected to the power take-off 12 by a universal joint 59. By replacing the conventional universal joints which have been shown with more expensive constant velocity universal joints, the angle X of the holder 20 can be increased beyond 25 degrees and can range upwardly to approximately 75 degrees. Also, the angle X may be shallower although the beneficial effect of inclining the holder is significantly negated if the angle X is made less than 15 degrees.

Figure 6:
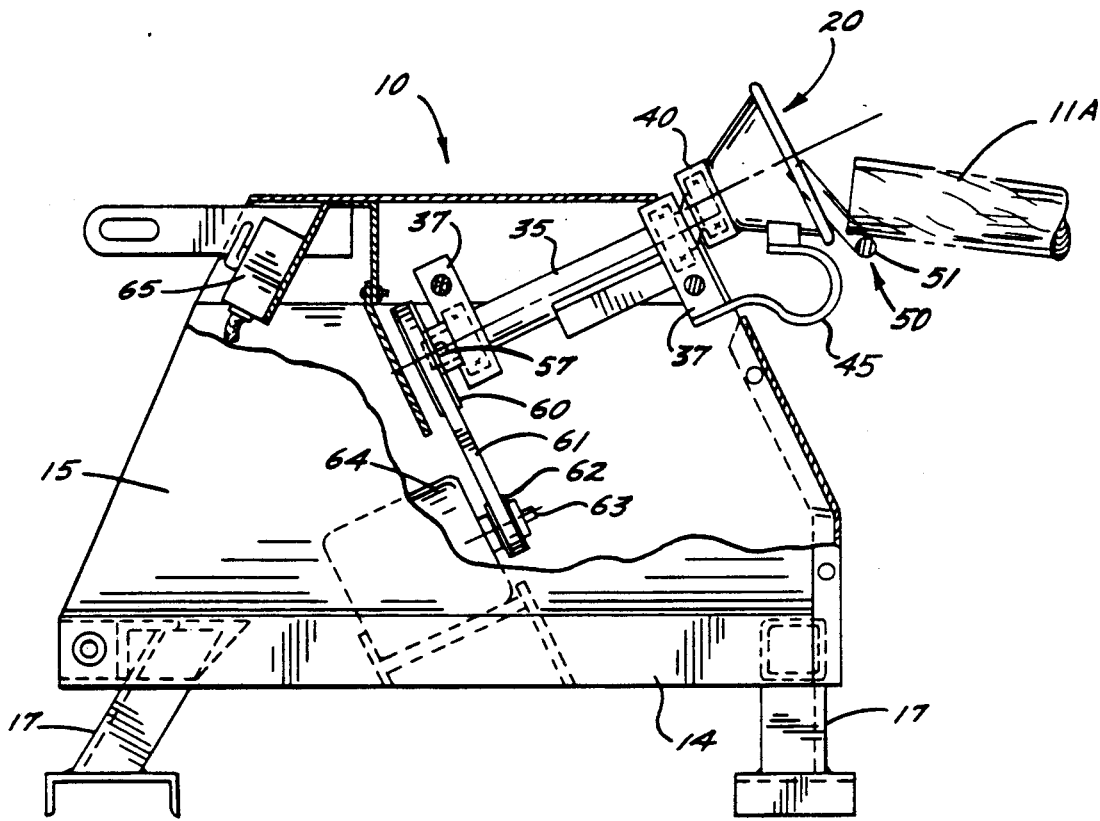
FIG. 6 is a view similar to FIG. 2 but shows another embodiment of the tree shaker.

The tree shaker 10 may be quickly converted for use from a power take-off drive to an electric drive. An electrically driven shaker is shown in FIG. 6. To effect the conversion, the pin 57 is removed to enable the universal joint 57 and the shaft 58 to be disconnected from the shaft 35. A pulley 60 then is installed on the lower end portion of the shaft 35 and is connected by an endless drive belt 61 to a pulley 62 on the drive shaft 63 of an electric motor 64 which may be mounted in the housing 15. The motor may be controlled by an on/off switch 65 in the housing.

Being driven by the electric motor 61, the tree shaker 10 may be conveniently used at a retail sales lot where a vehicle with a power take-off is not usually available.

Figure 7:
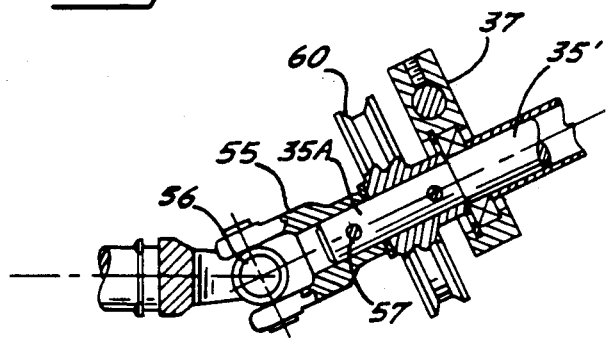
FIG. 7 is a view similar to FIG. 4 but shows a modified drive shaft.

FIG. 7 shows a modified shaft 35' in which the pulley 60 is permanently mounted between the ends of the shaft and in which the universal joint 56 is coupled by the pin 57 to an extension 35A on the lower end of the shaft. With this arrangement it is not necessary to install the pulley 60 to adapt the shaker 10 for electric drive or to remove the pulley to adapt the shaker for a power take-off drive.

We claim:

1. A machine for shaking loose needles from a cut decorative tree, said machine comprising a support, a tapered holder having a relatively large open outer end for receiving the trunk of the tree, means mounting said holder on said support for orbiting said holder about an axis which is inclined upwardly from horizontal at a predetermined angle whereby said trunk is located in an upwardly inclined position when said trunk is disposed in said holder, and power-operated means for orbiting said holder about said axis to cause said holder to shake said tree.

2. A machine as defined in claim 1 in which said angle is in the range of between 15 and 75 degrees.

3. A machine as defined in claim 1 in which said angle is approximately 25 degrees.

4. A machine as defined in claim 1 in which said mounting means comprise a rotatable shaft having upper and lower ends and having an axis coinciding with said predetermined axis, an eccentric on the upper end of said shaft and having an axis offset radially from said predetermined axis, said holder being rotatably supported on said eccentric, and a flexible strap connected between said holder and said support for permitting said holder to orbit about said predetermined axis while keeping said holder in a substantially fixed angular position in space about the axis of said eccentric.

5. A machine as defined in claim 1 in which the open end of said holder is disposed in a vertically inclined plane and has upper and lower sides, a guard for shielding said holder and for holding said trunk prior to placement of said trunk in said holder, said guard comprising a generally U-shaped and upwardly opening cradle having a lower portion located outwardly of and below the lower side of the open end of said holder and having side portions stradling at least part of the open end of said holder, and means for attaching said cradle to said support.

6. A machine as defined in claim 1 in which said mounting means comprise a rotatable shaft, a pulley fixed to said shaft, said power-operated means comprising an electric motor having a drive shaft with a pulley thereon, and an endless drive belt connecting said pulleys.

7. A machine as defined in claim 1 in which said mounting means comprise an inclined shaft having upper and lower ends and rotatable about an axis coinciding with said predetermined axis, a universal joint coupled to the lower end of said shaft, said power-operated means comprising a generally horizontal shaft having one end connected to said universal joint and having an opposite end connected to the power take-off of a motorized vehicle.

8. A machine as defined in claim 7 further including a drive pulley fixed to said inclined shaft between said universal joint and the upper end of said inclined shaft.

9. A machine for shaking loose needles from a cut decorative tree, said machine comprising a support, a shaft mounted on said support to rotate about a predetermined axis, an eccentric on one end of said shaft and having an axis which is radially offset from said predetermined axis, a holder for receiving the trunk of said tree and rotatably supported on said eccentric, means for rotating said shaft to cause said holder to orbit around said predetermined axis and shake said tree, and a flexible strap connected between said holder and said support for permitting said holder to rotate about said predetermined axis while keeping said holder in a substantially fixed angular position in space about the axis of said eccentric.

10. A machine as defined in claim 9 in which said shaft includes upper and lower ends and is mounted on said support such that said predetermined axis is inclined upwardly from horizontal, said holder being located on the upper end of said shaft.

11. A machine as defined in claim 9 in which said holder has an open end and upper and lower sides, a guard for shielding said holder and for holding said trunk prior to placement of said trunk in said holder, said guard comprising a generally U-shaped and upwardly opening cradle having a lower portion located outwardly of and below the lower side of the open end of said holder and having side portions straddling at least part of the open end of said holder, and means for attaching said cradle to said support.

12. A machine for shaking loose needles from a cut decorative tree, said machine comprising a support, a tapered holder having upper and lower sides and having a relatively large open outer end for receiving the trunk of the tree, means for causing said holder to orbit on said support and around a predetermined axis thereby to shake the tree, a guard for shielding said holder and for holding said trunk prior to placement of said trunk in said holder, said guard comprising a generally U-shaped and upwardly opening cradle having a lower portion located outwardly of and below the lower side of the open end of the holder and having side portions straddling at least part of the sides of the holder, and means for fixing said guard to said support.

13. A machine as defined in claim 12 in which said guard is located in a plane which slopes outwardly upon progressing downwardly from said axis.

14. A machine for shaking loose needles from a cut decorative tree, said machine comprising a support, a first shaft rotatably mounted on said support and having first and second ends, a holder connected to one end of said shaft for receiving the trunk of said tree and operable to shake the tree when the shaft is rotated, said holder having an axis which is inclined upwardly from horizontal at a predetermined angle, a universal joint connected to the second end of said shaft, a second shaft connected to said universal joint and adapted to be coupled to the power take-off of a motorized vehicle, and a drive pulley on said first shaft between the ends thereof and adapted to be connected by a drive belt to a motor.

* * * * *